Jan. 27, 1931.  W. H. SIPPEL ET AL  1,790,489

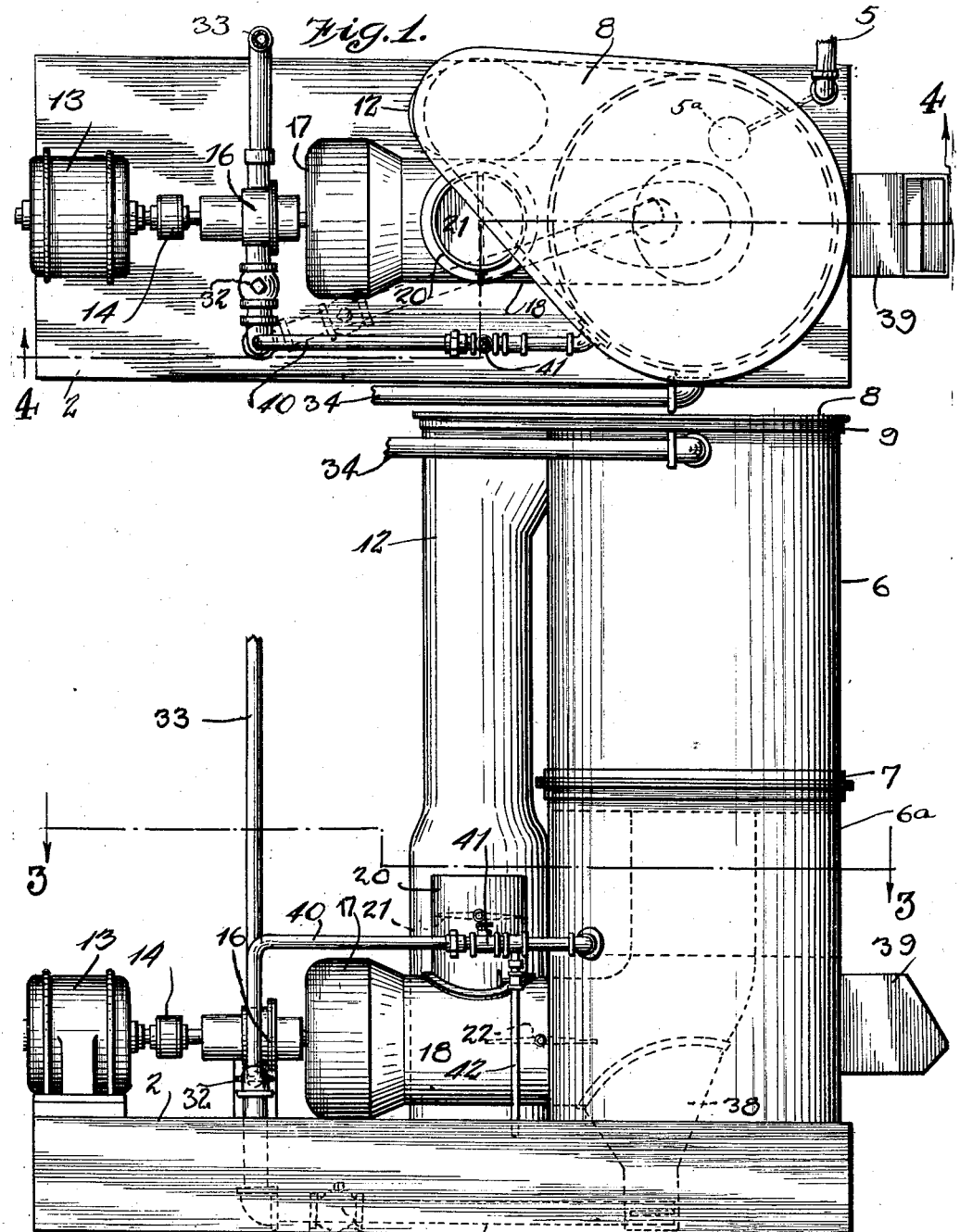

WATER RECOOLING APPARATUS

Filed Dec. 6, 1928  3 Sheets-Sheet 2

INVENTORS.
William H. Sippel &
BY James E. Farnsworth.
Bryant & Lowry
ATTORNEYS

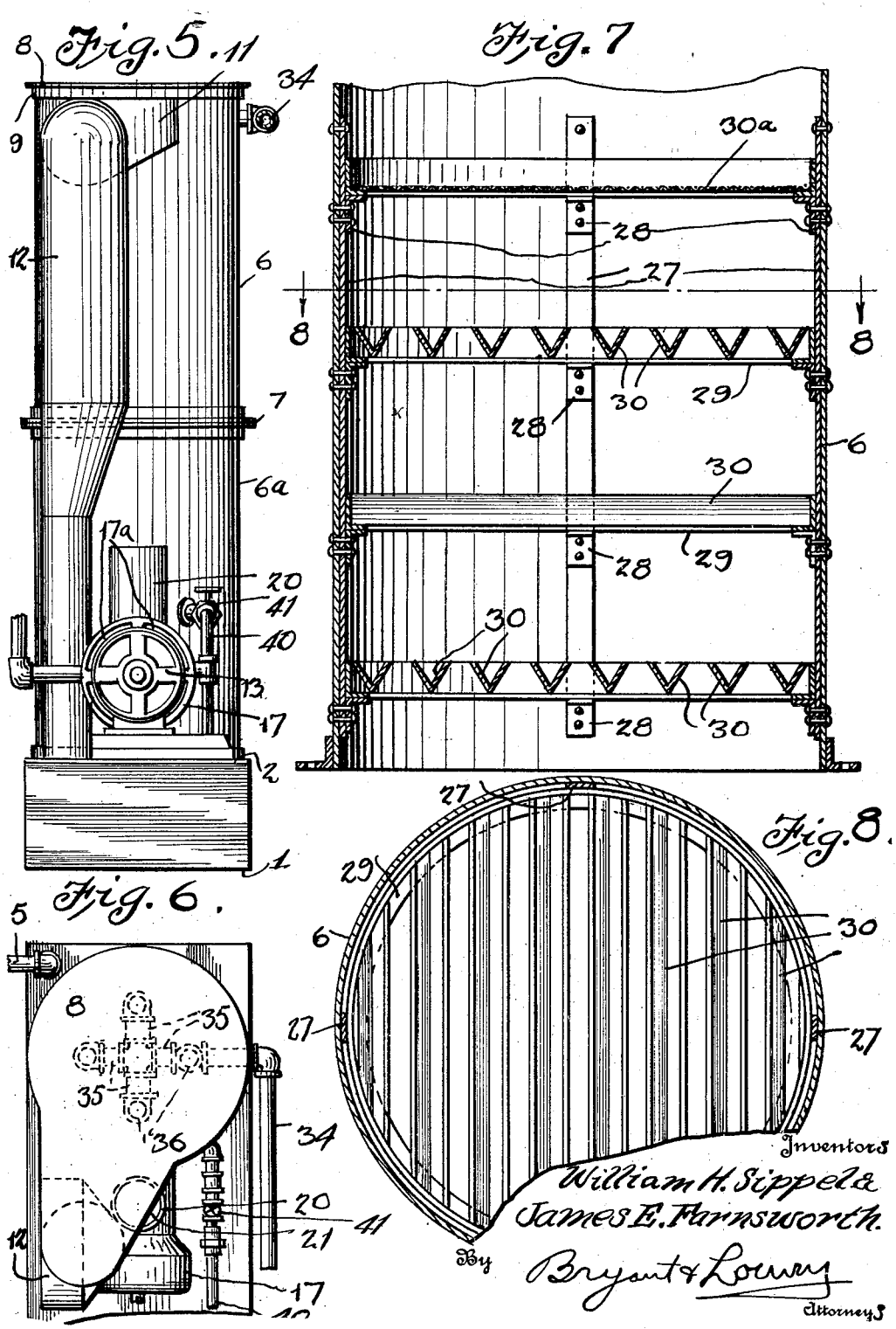

Patented Jan. 27, 1931

1,790,489

UNITED STATES PATENT OFFICE

WILLIAM H. SIPPEL AND JAMES E. FARNSWORTH, OF PITTSBURGH, PENNSYLVANIA, ASSIGNORS, BY MESNE ASSIGNMENTS, TO J. H. MORROW, OF PITTSBURGH, PENNSYLVANIA

WATER-RECOOLING APPARATUS

Application filed December 6, 1928. Serial No. 324,238.

This invention relates to certain new and useful improvements in water recooling apparatus and has particular reference to the cooling of water flowing through condensers associated with refrigerating apparatus, and for other purposes, the water travelling in a circuitous path to be recooled and reused in the system.

Another object of the invention is to provide water recooling apparatus embodying a novel construction of water baffling and spray plates or screens providing for an efficient diffusion of the water so that a blast of air blown therethrough will absorb considerable heat therefrom and deliver the water to condensing apparatus in a thoroughly cooled condition.

A still further object of the invention is to provide in a water cooling apparatus of the type above set forth, means for directing a multiplicity of relatively fine jets or streams of water to a point adjacent the fan blower where the force of air draft is at its maximum to insure enhanced cooling of the water in its path of travel to a condenser, the water being returned from the condenser to the recooling apparatus and again sprayed therethrough for recooling.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a top plan view of a water recooling apparatus constructed in accordance with the present invention;

Figure 2 is a side elevational view of the apparatus;

Figure 5 is an end elevational view;

Figure 6 is a fragmentary top plan view showing the water spray nozzle by dotted lines;

Figure 7 is a fragmentary sectional view on an enlarged scale of the upper end of the casing through which the water sprays are delivered and illustrating the novel construction of water breaking pans; and Figure 8 is a horizontal sectional view taken on line 8—8 of Figure 7.

Figure 3:
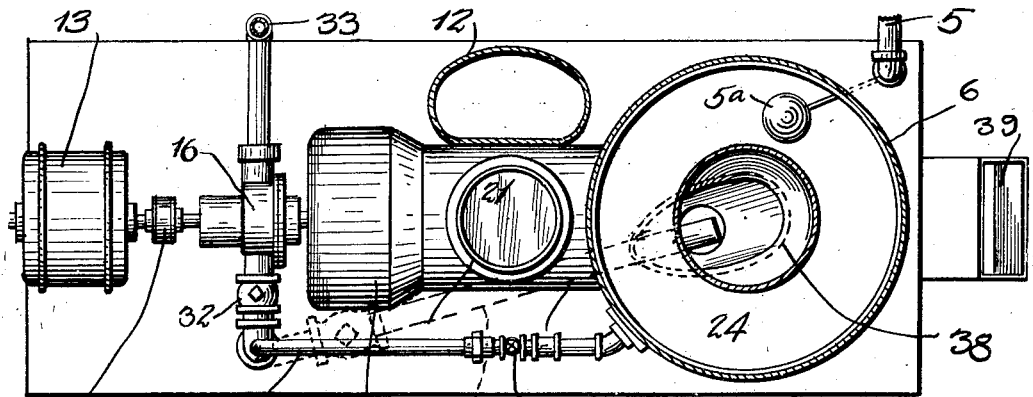
Figure 3 is a horizontal sectional view taken on line 3—3 of Figure 2.

While the water recooling apparatus may be constructed of any preferred design and of proportions desired, the same is herein illustrated as comprising a base tank 1 of rectangular form partially closed at its upper side by the wall 2 with the upper side of one end thereof provided with an opening 3 in communication with an air chamber 4 at the lower end of a perpendicular casing to be presently described. The tank 1 is supplied with water through the pipe line 5 and said tank contains the usual float mechanism to control the level of the water, which mechanism is illustrated by the numeral 5a usually found in apparatus of this character.

The perpendicular casing superposed above the opening 3 in the tank 1 is comprised of upper and lower sections 6 and 6a having a water and airtight connection 7, the casing sections 6 and 6a being circular in cross-section as illustrated in Figure 3 and closed at its upper end by the cover 8 having an air and watertight connection 9 with the upper end of the casing section 6. A side opening 10 is formed in the upper end of the casing section 6 and through the medium of the fitting 11 communicates with the down draft pipe 12 that has its lower end in communication with the tank 1, through the wall 2, the cover 8 may be of the form illustrated in Figures 1 and 4, and also in the form illustrated in Figures 5 and 6 for closing the upper end of the casing and air pipe 12.

Figure 4:
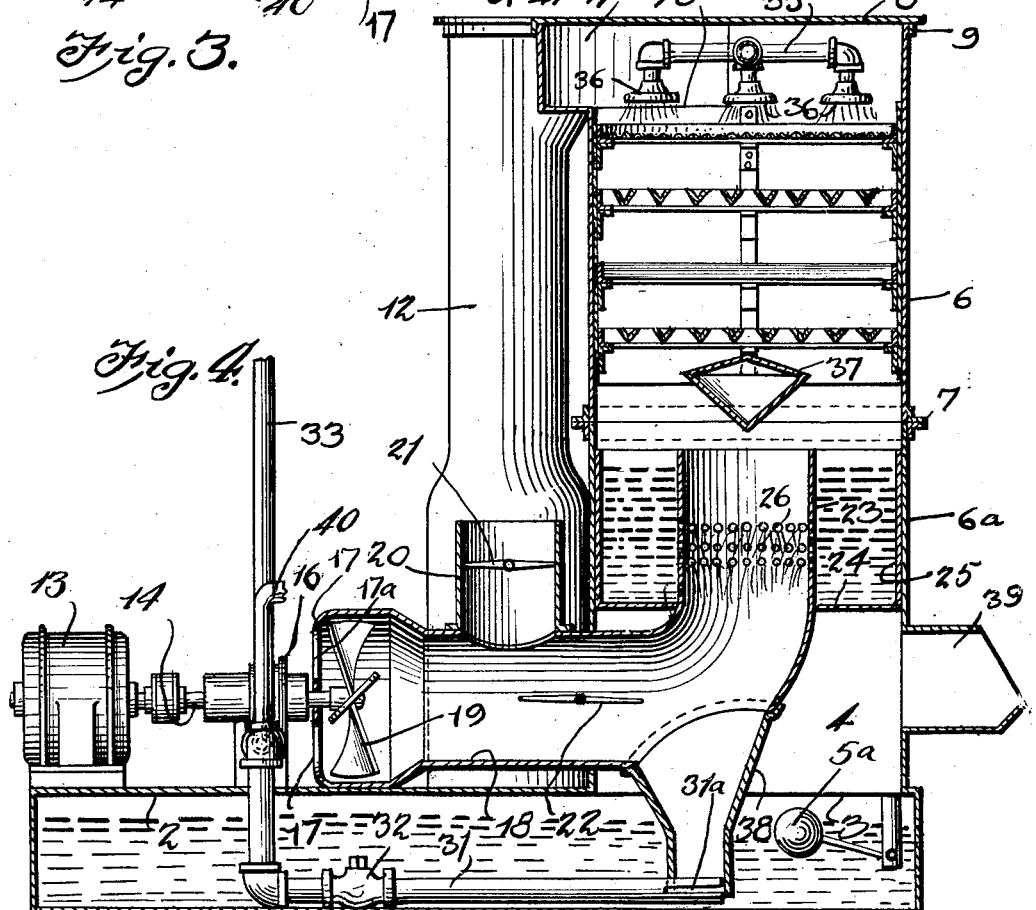
Figure 4 is a vertical longitudinal sectional view taken on line 4—4 of Figure 1.

The power devices comprise an electric motor 13 having the drive shaft 14 thereof extending through the pump 16 and forming the drive shaft thereof, the power shaft 14 continuing laterally of the pump 16 and passing through the rear wall 17 of the draft pipe 18 and having a fan wheel 19 secured thereto within the rear end of the draft pipe 18. Air is admitted to the draft or air pipe 18 through openings 17a formed in the rear wall 17 of said pipe and is forced through the pipe by action of the fan wheel 19. The air draft pipe 18 is provided with a lateral outlet 20 that is damper controlled as at 21, while a damper 22 in the air draft pipe 18 forwardly of the lateral outlet 20 controls the flow of air through the draft pipe. As illustrated in Figure 4, the damper 21 is closed and the damper 22 is opened and when the two dampers are so positioned, an air blast created by the fan 19 flows through the air blast pipe 18, but, when the two dampers are reversely positioned, air draft created by the fan 19 is exhausted laterally through the side outlet 20 and does not flow through the apparatus, this construction and arrangement permitting continuous operation of the motor 13 with the current of air exhausted from the air draft pipe rather than being driven through the cooling apparatus.

While the air blast pipe 18 is illustrated as enlarged at the end thereof housing the fan wheel, it is to be understood that said pipe 18 may be of constant diameter throughout its length and either disposed horizontally or inclined, the pipe being associated with the apparatus to produce the most efficient results. The forward end of the draft pipe 18 extends through a side opening in the lower end of the casing section 6a and is provided upon the inner end thereof with a perpendicularly extending elbow 23 that is surrounded by a receptacle comprising a bottom wall 24 and a side wall 25 that is set into the casing section 6a and suitably secured thereto as by riveting or welding. The side wall of the elbow section 23 at a point spaced above the bottom wall 24 of the receptacle is provided with a plurality of circular series of perforations 26 for purposes presently to appear.

A plurality of water baffling elements are removably supported in the casing section 6 and said baffling elements and associate devices comprise vertical reinforcing strips 27 secured to the side wall of the casing section 6 with angle brackets 28 attached thereto. A baffling element of one set comprises a unitary structure laterally removable from the casing and including a supporting ring 29 angular in cross-section as shown in Figures 4 and 7 with a plurality of troughs, V-shaped in cross-section as indicated at 30 secured to each ring and arranged parallel with each other, the longitudinal axes of one set of troughs being at right angles to the longitudinal axes of the troughs of the adjacent baffling unit as illustrated in said figures. The baffling elements also comprise screen devices, one of which is designated by the reference numeral 30a and is in the form of a screen fixed to an associated ring 29 to cause a fine diffusion of water flowing therethrough. If desired, the screens 30a may be arranged alternately with the V-shaped troughs 30, the object being to so associate the screens and baffling troughs as to obtain a perfect diffusion of water flowing therethrough.

The water in the tank 1 is drawn into the pump 16 by means of the pipe 31 disposed adjacent the bottom wall of said tank and having a check valve 32 therein to insure the presence of water in the pump 16 to eliminate the necessity of priming and said water is delivered from the pump 16 through the outlet pipe 33 to a condenser and from said condenser, the water is returned to the apparatus by means of the pipe 34 that extends into the upper end of the casing section 6 as shown in Figures 4 and 6 and terminating in a plurality of branch pipes 35, each having a downwardly directed spray nozzle 36. The main priming apparatus for the pump 16 comprises a pipe 40 in communication with the lower end of the chamber surrounding the elbow 23 of the air blast pipe 18 at a point below the perforations 26 in said elbow, the pipe 40 being in communication with the pipe 31 between the check valve 32 and said pump for the delivery of priming water to the pump when the apparatus is idle. The priming pipe 40 is provided with a control valve 41 and further has a valve controlled drain pipe 42 leading therefrom to the front tank 1 so that water in the chamber surrounding the elbow 23 may be completely drained therefrom when desired.

In the operation of the device, water is drawn from the tank 1 through the pipe 31 into the pump 16 by way of the check valve 32, the pump 16 forcing the water through the pipe 33 to the condenser for cooling purposes. The water is returned from the condenser to the pipe 34 and branch pipes 35 to the nozzles 36 that throw the water over the entire area within the upper end of the casing section 6. The descending streams of water projected by the nozzles 36 are sprayed over the screen 30a and V-shaped troughs 30 and seeping over the edges thereof depend in relatively fine streams and jets from the lower ends of said trough and in view of the crossed arrangement of the different units of troughs, the entire area within the casing section 6 is filled with water sprays. The descending sprays of water are directed outwardly of the open upper end of the elbow 23 by the diamond shaped baffle 37 to fall into the receptacle surrounding the elbow, the blast of air created by the fan wheel 19 blowing through the air pipe 18 and elbow 23 and being deflected by the baffle 37 for partly breaking up the particles of descending water in the casing section 6 and for absorbing heat contained in the water. The water in the receptacle surrounding the elbow is sprayed through the elbow perforations 26 and being further cooled by the blast of air blown therethrough discharges into the funnel shaped member 38 at the lower side of the elbow 23 for discharge into the lower end of the tank 1 and in proximity of the inlet end of the pipe 31 that is slotted as at 31a and extends into the lower open end of the member 38. The air blown upwardly through the elbow 23 and casing section 6 passes through the opening 10 at the upper end of the casing and thence downwardly through the stand pipe 12 into contact with the surface of the water in the tank 1 for further chilling the water, the air finally outletting through the pipe section 39 carried by the side wall of the casing section 6a and which air may be utilized for desired purposes in view of the cleansing and humidifying effect obtained by passing of the air through the water. Among the novel features upon which the invention in this case is predicated, are included the water baffling screen 30a and elements 30 of V-shape in cross-section that are carried by the rings 29 removably positioned within the casing section 6 and their particular crossed relation as illustrated in Figure 7. The association of the water receptacle in surrounding relation to the perforated elbow 26 with the water spraying over the air at a point where the air is substantially travelling with a maximum velocity insures a more perfect cooling of the water prior to its discharge through the funnel-shaped member 38 into the tank 1.

While there is herein shown and described the preferred embodiment of the present invention, it is nevertheless to be understood that minor changes may be made therein without departing from the spirit and scope of the invention as claimed.

We claim:—

1. In a water cooling apparatus, a vertically disposed casing, means for spraying water downwardly through the casing, a plurality of baffling units intercepting the sprayed water, each bodily removable from the casing and comprising a ring and parallel V-shaped troughs carried by the ring, a vertical air blast pipe at the lower end of the casing, a water collection receptacle surrounding the pipe, said pipe having a plurality of perforations therein to permit water in the receptacle to spray therethrough, and an outlet in the blast pipe communicating with the base chamber.

2. In a water cooling apparatus, a vertically disposed casing, means for spraying water downwardly through the casing, a plurality of baffling units intercepting the sprayed water, each bodily removable from the casing and comprising a ring and parallel V-shaped troughs carried by the ring, a vertical air blast pipe at the lower end of the casing, a water collection receptacle surrounding the pipe, said pipe having a plurality of perforations therein to permit water in the receptacle to spray therethrough, an outlet in the blast pipe communicating with the base chamber, and means for directly sprayed water from the baffling units laterally of the open upper end of the blast pipe and into the water collection receptacle.

3. In a water cooling apparatus, a vertically disposed casing, means for spraying water downwardly through the casing, a plurality of baffling units intercepting the sprayed water, each bodily removable from the casing and comprising a ring and parallel V-shaped troughs carried by the ring, the longitudinal axes of the troughs of adjacent units being disposed at an angle, a vertical air blast pipe at the lower end of the casing, and means for directly sprayed water from the baffling units laterally of the open upper end of the blast pipe and a water collection receptacle beneath the units.

4. A water cooling apparatus including a base chamber, a vertical casing, an air blast pipe above the base chamber and extending into the casing for directing a blast of air upwardly through the casing, water baffling units in the upper end of the casing, a water collection receptacle in the lower end of the casing surrounding the inner end of the blast pipe, said pipe comprising a vertical section perforated above the bottom wall of the water collection receptacle, and an outlet in the lower side of the pipe communicating with the base chamber.

5. A water cooling apparatus including a base chamber, a vertical casing, an air blast pipe above the base chamber and extending into the casing for directing a blast of air upwardly through the casing, water baffling units in the upper end of the casing, a water collection receptacle in the lower end of the casing surrounding the inner end of the pipe, said pipe comprising a vertical section perforated above the bottom wall of the water collection receptacle, an outlet in the lower side of the pipe communicating with the base chamber, means for forcing water from the base chamber to a condensing apparatus and returning the same to spray downwardly at the upper end of the casing, and means for forcing air through the blast pipe.

6. A water cooling apparatus comprising a casing, upper and lower water spraying devices therein, water baffling devices between the spraying devices, a single air blast fan for the baffling and spraying devices, operating first to blow air through the lower spray device and then through the baffling device, and a double conical member to direct water from the baffling device laterally of the air blast and to direct the air toward the peripheral edges of the baffling devices.

7. A water cooling apparatus comprising a casing, upper and lower water spraying devices therein, water baffling devices between the spraying devices, a single air blast fan for the baffling and spraying devices comprising a pipe forming a part of the lower spray device, a base chamber, said pipe communicating with the base chamber for discharging water sprayed therethrough into the base chamber, and circulating means for the cooled water and returning the same to the upper end of the casing for recooling.

8. In a water cooling apparatus, a base tank, a vertical casing thereon, an air pipe forming communication between the upper end of the casing and base chamber, water baffling devices in the upper end of the casing, a water collection chamber in the lower end of the casing, an air blast pipe extending into the casing and directed upwardly through the collection chamber with perforations therein for spraying water from the collection chamber, an outlet at the lower side of the blast pipe communicating with the base chamber for water sprayed through the blast pipe and means for forcing water from the base chamber to condensing apparatus and returning the same to the upper end of the casing for recooling.

9. A water cooling apparatus including a base chamber, a vertical casing, an air blast pipe above the base chamber and extending into the casing for directing a blast of air upwardly through the casing, water baffling units in the upper end of the casing, a water collection receptacle in the lower end of the casing surrounding the inner end of the blast pipe, said pipe comprising a vertical section perforated above the bottom wall of the water collection receptacle, and an outlet in the lower side of the pipe communicating with the base chamber, a pump for circulating water through the apparatus and a pipe extending from the water collection receptacle to the pump for priming the same.

10. A water cooling apparatus including a base chamber, a vertical casing, an air blast pipe above the base chamber and extending into the casing for directing a blast of air upwardly through the casing, water baffling units in the upper end of the casing, a water collection receptacle in the lower end of the casing surrounding the inner end of the blast pipe, said pipe comprising a vertical section perforated above the bottom wall of the water collection receptacle, an outlet in the lower side of the pipe communicating with the base chamber, a pump for circulating water through the apparatus and a pipe extending from the water collection receptacle to the pump for priming the same, and a drain pipe for the receptacle extending between the aforesaid pipe and base chamber.

In testimony whereof we affix our signatures.

WILLIAM H. SIPPEL.
JAMES E. FARNSWORTH.